(12) United States Patent
Müller et al.

(10) Patent No.: US 12,535,403 B2
(45) Date of Patent: Jan. 27, 2026

(54) MEASURING CELL, MEASURING CELL RECEPTACLE AND MEASURING DEVICE WITH A MEASURING CELL

(71) Applicant: Endress+Hauser Conducta GmbH+Co. KG, Gerlingen (DE)

(72) Inventors: Andreas Müller, Ostfildern (DE); Hans Meyer, Eschach (DE); Matthias Großmann, Vaihingen-Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 128 days.

(21) Appl. No.: 18/508,305

(22) Filed: Nov. 14, 2023

(65) Prior Publication Data
US 2024/0167937 A1 May 23, 2024

(30) Foreign Application Priority Data
Nov. 22, 2022 (DE) ...................... 10 2022 130 906.1

(51) Int. Cl.
*G01N 21/01* (2006.01)
(52) U.S. Cl.
CPC ....... *G01N 21/01* (2013.01); *G01N 2201/021* (2013.01)
(58) Field of Classification Search
CPC ............................... G01N 21/01; G01N 21/03
See application file for complete search history.

(56) References Cited

U.S. PATENT DOCUMENTS 4,311,387 A * 1/1982 deMey ................... G01N 21/03
356/244

FOREIGN PATENT DOCUMENTS

| DE | 29914561 U1 | 12/1999 |
| DE | 102010044237 A1 | 3/2012 |
| WO | 2012062829 A1 | 5/2012 |

* cited by examiner

*Primary Examiner* — Tony Ko
(74) *Attorney, Agent, or Firm* — Christopher R. Powers; Endress+Hauser (USA) Holding, Inc.

(57) ABSTRACT

A measuring device includes: a measuring cell, which can be manufactured cost-effectively and is easy to handle, insert and/or replace; a measuring cell receptacle for receiving the measuring cell, which is or can be clamped in the measuring cell receptacle; and a sensor for measuring for measuring at least one measured variable for a medium located in the measurement chamber or flowing through the measurement chamber of the measuring cell. The measuring cell includes a measurement chamber through which the medium can flow or which can be filled with a medium and a spring system with which the measuring cell can be clamped in the measuring cell receptacle in at least one clamping direction relating to a measurement chamber axis of the measurement chamber.

15 Claims, 3 Drawing Sheets

MEASURING CELL, MEASURING CELL RECEPTACLE AND MEASURING DEVICE WITH A MEASURING CELL

CROSS-REFERENCE TO RELATED APPLICATION

The present application is related to and claims the priority benefit of German Patent Application No. 10 2022 130 906.1, filed Nov. 22, 2022, the entire contents of which are incorporated herein by reference.

TECHNICAL FIELD

The present disclosure relates to a measuring cell for receiving a medium, to a measuring cell receptacle for receiving the measuring cell, and to a measuring device having a measuring cell that is or can be inserted into a measuring cell receptacle and a sensor for measuring at least one measured variable for a medium located in the measuring cell or flowing through the measuring cell.

BACKGROUND

Measuring cells, such as flow-through cells, are used in a large number of different applications in measuring devices for measuring at least one measured variable for a medium located in the measuring cell or flowing through the measuring cell.

Figure 1:
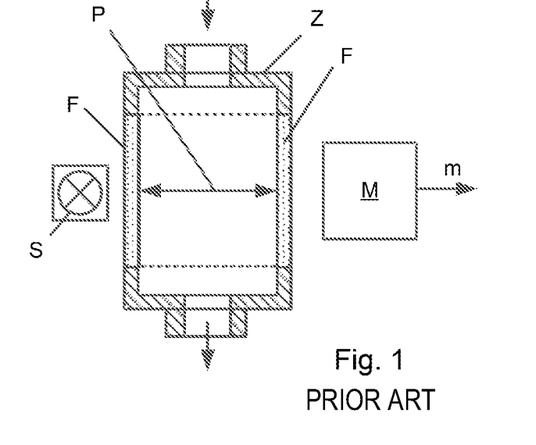
FIG. 1 shows a schematic of a conventional measuring device having a flow-through cell and a sensor.

An example of such a measuring device having a measuring cell designed as a flow-through cell Z and a sensor is shown in FIG. 1. The flow-through cell shown has two windows F inserted in the opposite outer walls thereof, through which windows optical measurements of measured variables for the medium flowing through the flow-through cell Z can be performed by means of the sensor, designed here as an optical sensor. The sensor shown in FIG. 1 comprises a transmitting device S, such as a light source, by means of which transmission radiation is transmitted through one of the windows F into a measurement chamber of the flow-through cell Z, and a measuring device M, which receives measurement radiation exiting from the opposite window F from an interaction of the transmission radiation along an optical path P running through the medium located in the measurement chamber. On the basis of the measurement radiation, a measurement result m for at least one measured variable for the medium is determined and made available by means of an evaluation device integrated in or connected to the measuring device M.

By means of optical sensors, different measurement variables can be measured depending upon the type of sensor and/or interaction, such as absorption, reflection, scattering or fluorescence. Examples known from the prior art include turbidity sensors for measuring turbidity of the medium, sensors for measuring a solids concentration in the medium, fluorescence sensors and absorption sensors, such as sensors for measuring a spectral absorption coefficient or a concentration of an analyte in the medium.

Achieving measurement results that are as accurate as possible in a reproducible manner using measuring devices of the type shown in FIG. 1 requires precise and mechanically stable spatial positioning of the components of the sensor, such as the transmitting device S and the measuring device M, relative to one another and to the measuring cell containing the medium.

There are a large number of applications, such as applications in biotechnology, in which, for hygiene reasons and/or to avoid contamination, single-use measuring cells are used as disposable measuring cells. There is therefore a need for the most cost-effective manufacturability possible and the simplest possible handling and replaceability of these disposable measuring cells.

WO2012/062829 A1 describes a measuring device in which a replaceable disposable flow-through cell is arranged in an interior of a housing, which comprises two housing halves that are each open toward the disposable flow-through cell and are detachably connected to one another by a plurality of stud bolts. The measuring device comprises a UV sensor which has a light source assembly detachably fastened to one of the housing halves and a detector assembly which is detachably fastened to the other housing half.

However, it is disadvantageous here that the two housing halves and the measuring cell form three parts which are movable independently of one another and which must be assembled by hand with precision (e.g., with a tight fit). This requires a certain degree of fingertip feel. The latter is problematic in particular when the assembly operation must be performed, for example, under clean-room conditions by operating personnel wearing gloves and/or protective clothing. In addition, the two housing halves must be connected to one another by a plurality of stud bolts. This operation is time-consuming and requires the use of a tool.

SUMMARY

One object of the present disclosure is to provide a measuring cell which can be produced as cost-effectively as possible and can be handled, inserted and/or replaced in a simpler manner.

For this purpose, the present disclosure includes a measuring cell comprising: a measurement chamber through which a medium can flow or which can be filled with a medium; and a spring system designed as a component of the measuring cell, in particular a spring system comprising at least one spring, with which the measuring cell can be clamped in a measuring cell receptacle in at least one clamping direction relating to a measurement chamber axis of the measurement chamber.

The measuring cell offers the advantage that it can be clamped in the installation position in the measuring cell receptacle in a very simple manner due to the spring system formed as a component, in particular as an integral component, of the measuring cell. For this purpose, a clamping device can easily be used which is operable without a tool. The measuring cell can in particular thus also be clamped and/or replaced by operating personnel wearing gloves and/or protective clothing. The spring system offers the advantage that, in particular in the case of vibrations, impacts and/or temperature changes which may occur, it provides robust and precise positioning of the clamped measuring cell. A further advantage is that the clamping of the measuring cell also at the same time enables exact and mechanically stable positioning of the measurement chamber of the measuring cell relative to the component, or each component, of a sensor that is or can be mounted on the outer side of the measuring cell receptacle in order to measure at least one measured variable for a medium located in the measurement chamber or flowing through the measurement chamber.

A first embodiment includes that the spring system comprises:

at least one spring, which in each case can be clamped by a clamping force which can be exerted thereon by the measuring cell receptacle from the outside, by means of which spring the measuring cell can be clamped in the measuring cell receptacle, at least one spring in each case formed as a transverse spring, by means of which the measuring cell can be clamped in the measuring cell receptacle in a transverse clamping direction running perpendicularly to the measurement chamber axis, and/or at least one spring in each case designed as an axial spring, by means of which the measuring cell can be clamped in the measuring cell receptacle in an axial clamping direction running in parallel with the measurement chamber axis.

A further embodiment of the first embodiment includes in that the spring, at least one of the springs, or each spring, is in each case designed as a substantially rod-shaped spring element which comprises an end region connected to a rigid region of a measuring cell body of the measuring cell and a spring region which is connected thereto and can be clamped by the clamping force that can be exerted on the relevant spring from the outside, wherein the spring region is in particular rod-shaped and/or is formed by a flexible region of the measuring cell body.

A further embodiment of the last-mentioned embodiment includes in that:

a) the spring region of the at least one spring, or of each spring, formed as a transverse spring in each case:

a1) has an end region which is deflectable in the transverse direction by the clamping force exertable on the relevant spring from the outside and is opposite the end region connected to the measuring cell, and a2) extends in a direction running perpendicularly to the measurement chamber axis and/or is oriented such that its end region opposite the end region connected to the rigid region of the measuring cell body projects outward in the transverse direction when the relevant spring is relaxed, and/or b) the spring region of the at least one spring, or each spring, designed as an axial spring, in each case comprises an end region which can be deflected in the axial direction by the clamping force which can be exerted on the relevant spring from the outside and is opposite the end region connected to the rigid region of the measuring cell body, wherein the spring region:

b1) is oriented such that the deflectable end region thereof protrudes outward in a direction running away from the measurement chamber and in parallel with the measurement chamber axis when the relevant spring is relaxed, or b2) is designed such that the spring region extends in a direction running perpendicularly to the measurement chamber axis when the relevant spring is relaxed, and the deflectable end region has a projection which projects outward in a direction away from the measurement chamber and parallel to the measurement chamber axis.

A second embodiment includes in that:

two end regions opposite one another along the measurement chamber axis of a measurement chamber wall surrounding the outside of the measurement chamber, at least in portions, are surrounded on the outside on all sides by an end plate extending radially outward perpendicularly to the measurement chamber axis, and at least one spring, or each spring, of the spring system is formed by an edge region of an outer edge of one of the end plates.

A further embodiment of the second embodiment includes in that:

each end plate comprises four outer edges arranged in a square or in a rectangle, at least one of the end plates, or each end plate, is configured such that:

a first edge and/or a second edge opposite the first edge of the relevant end plate comprises in each case one or two springs of the spring system which are formed as transverse springs and arranged opposite one another and by means of which the measuring cell can be clamped in the measuring cell receptacle in a direction running perpendicularly to the measurement chamber axis, and/or a third edge and/or a fourth edge opposite the third edge of the relevant end plate comprises one or two springs of the spring system, which are formed as axial springs and are arranged opposite one another and by means of which the measuring cell can be clamped in the measuring cell receptacle in a direction running in parallel with the measurement chamber axis.

A third embodiment includes in that the plug-connector elements, in particular plug-connector elements in the form of dowel pins or recesses, which are distributed on an outer side facing a base element of the measuring cell receptacle when said measuring cell is inserted in the measuring cell receptacle, and are designed and arranged such that they interlockingly engage in complementary plug-connector elements of the base element that are distributed over an inner side of the base element when the measuring cell is inserted into the measuring cell receptacle in a position that is predetermined for the measuring cell.

A fourth embodiment includes in that the measuring cell:

is designed as a flow-through cell and/or as a disposable measuring cell, has a measuring cell body made of a plastic and/or a sterilizable material, comprises a measuring cell body designed as an injection-molded part and/or forming the measuring cell, and/or comprises a disposable measuring cell body comprising the spring system.

Furthermore, the present disclosure comprises a measuring cell receptacle for receiving a measuring cell according to the present disclosure, comprising:

a cavity which is delimited by two side elements arranged opposite one another and a base element of the measuring cell receptacle, into which cavity the measuring cell is or can be inserted through an opening of the measuring cell receptacle opposite the base element in such a way that the measurement chamber axis of the measuring cell runs in parallel with a straight line running through both side elements when the measuring cell is inserted into the measuring cell receptacle, and a clamping device which is designed to exert a clamping force on the spring system of the measuring cell inserted or clamped in the measuring cell receptacle.

A first embodiment of the measuring cell receptacle includes in that the clamping device comprises a transverse clamping device which comprises a clamping element and a counter bearing formed by the base element, and the clamping element is designed such that it:

can be moved into a starting position in which the clamping element releases the opening in such a way that the measuring cell can be inserted through the opening and into the measuring cell receptacle, and can be moved into a clamping position and can be fixed in the clamping position in such a way that the clamping element exerts a clamping force on the at least one spring, or each spring, formed as a transverse spring of the measuring cell arranged in the measuring cell receptacle, by means of which force the measuring cell is clamped between the clamping element and the base element.

A further embodiment of the last-mentioned embodiment includes in that:
a) an end region of the clamping element is rotatably connected to a first of the two side elements via a hinge and an end region of the clamping element remote from the hinge is or can be fastened in a detachable manner to the second side element by fastening means, in particular by a mechanical latching device, by a closure system, by a locking system or by a screw which can be screwed through the clamping element into the second side element, in particular a screw equipped with a rotary knob arranged on an outer side of the clamping element, or
b) the clamping element has two end regions opposite one another which are or can be detachably fastened by fastening means on the end faces of the side elements remote from the base element,
wherein the fastening means comprise, in particular, mechanical latching devices, a closure system, a locking system or screws which can each be screwed through the clamping element into one of the side elements, or the fastening means comprise, in particular, at least two devices arranged on the two opposite end regions of the clamping element, which devices, in particular, automatically, in particular positively and/or non-positively, connect to complementary devices provided on the two side elements when the clamping element is brought into the clamping position.

A second embodiment of the measuring cell receptacle includes in that:
the clamping device comprises an axial clamping device formed by the two side elements, and
a distance of the two side elements from one another is of such a size that the side elements exert a parallel to the measurement chamber axis from the outside onto the at least one spring, or each spring, formed as an axial spring of the measuring cell that is inserted into the measuring cell receptacle.

Furthermore, the present disclosure comprises a measuring device having a measuring cell receptacle according to the present disclosure, a measuring cell according to the present disclosure, which is or can be clamped in the measuring cell receptacle, and a sensor for measuring for measuring at least one measured variable for a medium which is located in the measurement chamber or flowing through the measurement chamber of the measuring cell.

A first variant of the measuring device includes in that it:
a) is designed such that the sensor comprises a recess into which the measuring cell receptacle is or can be inserted, or
b) is designed as a sensor, wherein:
the sensor comprises the measuring cell receptacle,
the sensor has a recess for receiving the measuring cell, in which the measuring cell is or can be clamped by means of the clamping device, and/or
the side elements and the base element of the measuring cell receptacle are each formed by a housing region of a sensor housing of the sensor.

A second variant of the measuring device includes in that:
the sensor comprises a first and/or a second component, each of which is or can be fastened to an outer side of one of the two side elements,
the side element, or each side element, has a fastening device, in particular a threaded connector, on its outer side for fastening the first or the second component of the sensor,
the first component comprises a transmitting device and is designed to transmit transmission radiation into the measurement chamber through an opening provided in the side element, on which the first component is or can be mounted, and a transparent outer wall of the measurement chamber or a window inserted into an outer wall of the measurement chamber, and/or
the second component comprises a measuring device and is designed to receive measurement radiation exiting the measurement chamber through a transparent outer wall of the measurement chamber or a window inserted into an outer wall of the measurement chamber through an opening that is provided in the side element, on which the second component is or can be mounted, and to determine and provide a measured signal that is dependent on the measured variable, or on each measured variable,
wherein the measuring device comprises, in particular, a detector, and/or in particular is designed to provide the measured signal to an evaluation device integrated in the measuring device or connected to the measuring device, which evaluation device determines a measurement result for the measured variable(s) from the measured signal and displays it via an interface connected thereto, outputs it in the form of measured values, in the form of measured signals and/or in some other way and/or provides it in a readable form.

An embodiment of the measuring device comprises:
the sensor is designed as an optical sensor, as a turbidity sensor for measuring turbidity of the medium, as a sensor for measuring a solid concentration in the medium, as a fluorescence sensor or as an absorption sensor, in particular as a sensor for measuring a spectral absorption coefficient or a concentration of an analyte in the medium,
an inlet connected to the measurement chamber and/or an outlet connected to the measurement chamber of the measuring cell each comprise a connection device or a connection device designed as a connection thread to which a process connection that may be selected from a group of process connections having different designs can be connected, and/or
the measuring cell receptacle has a fastening device for fastening the measuring cell receptacle at an installation location, wherein the fastening device comprises, in particular, bores running through the base element for receiving fastening screws, by means of which fastening screws the base element can be fastened to a carrier provided at the installation location.

BRIEF DESCRIPTION OF THE DRAWINGS

The present disclosure and its advantages will now be explained in detail using the figures in the drawings, which show one exemplary embodiment. The same elements are indicated by the same reference numbers in the figures.

DETAILED DESCRIPTION

Figure 2:
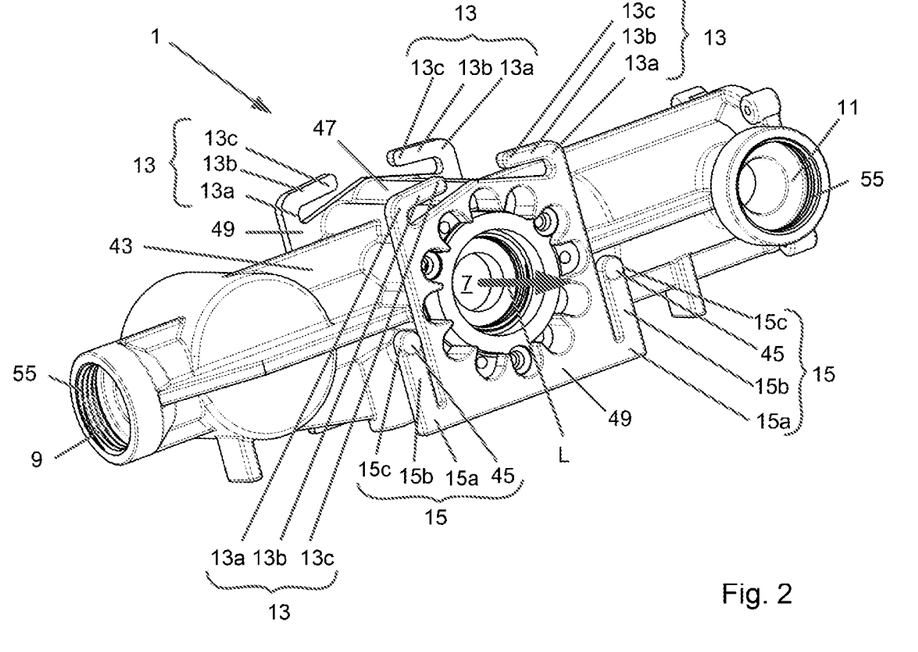
FIG. 2 shows a perspective view of a measuring cell according to the present disclosure.
Figure 3:
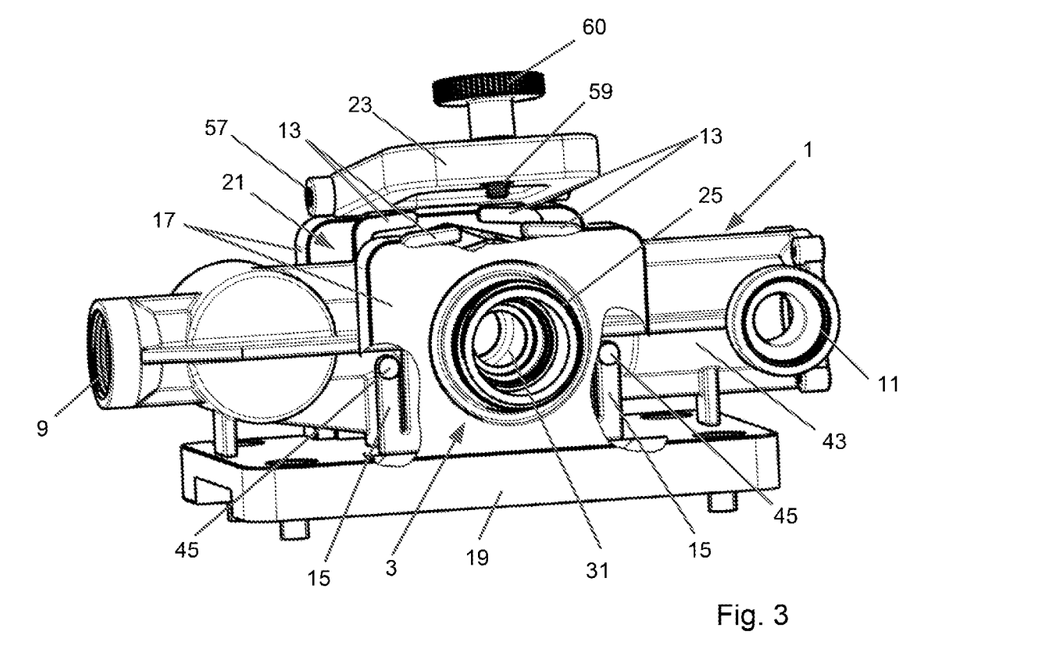
FIG. 3 shows a partially sectional view of a measuring cell receptacle, into which the measuring cell from FIG. 2 is inserted.

The present disclosure comprises a measuring cell 1, a measuring cell receptacle 3, and a measuring device 100 for measuring at least one measured variable for a medium, which device comprises the measuring cell 1, the measuring cell receptacle 3, and a sensor 5. FIG. 2 shows a perspective view of an embodiment of the measuring cell 1. FIG. 3 shows a partially sectional view of an embodiment of the measuring cell receptacle 3 into which the measuring cell 1 shown in FIG. 2 is inserted.

The measuring cell 1 comprises a measurement chamber 7 through which a medium can flow or which can be filled with a medium. The measuring cell 1, shown as an example in FIG. 2, is designed as a flow-through cell, through which the medium can flow. For this purpose, the measuring cell 1, e.g., comprises an inlet 9 and an outlet 11. A supply line (not shown), via which the medium 1 can be fed to the measurement chamber 7, can be connected to the inlet 9. A discharge line (not shown), via which the medium 1 can be removed from the measurement chamber 7, can be connected to the outlet 11. Alternatively, however, the measuring cell 1 can also be designed as a cuvette, a measurement chamber of which is formed by an interior cuvette space that can be filled with a sample of the medium.

The measuring cell 1 has a measurement chamber axis L (depicted as a bold arrow in FIG. 2) running through the measurement chamber 7. In conjunction with measuring cells for performing optical measurements of at least one measured variable of a media which is located in the measuring cell 1 or flowing through the measuring cell 1, the measurement chamber axis L corresponds, for example, to the optical path P extending through the measuring device previously described on the basis of the conventional measuring device shown in FIG. 1 through the measurement chamber of the flow-through cell Z.

The measuring cell 1 is designed as a unit which can be inserted into a measuring cell receptacle, such as the measuring cell receptacle 3 shown in FIG. 3, and can be clamped in the measuring cell receptacle 3. For this purpose, the measuring cell 1 comprises a spring system with which the measuring cell 1 can be clamped in the measuring cell receptacle 3 in at least one clamping direction relating to the measurement chamber axis L of the measurement chamber 7.

The spring system preferably comprises at least one spring 13, 15, which in each case can be clamped by a clamping force that can be exerted thereon by the measuring cell receptacle 3 from the outside, by means of which measuring cell 1 can be clamped in the measuring cell receptacle 3.

The spring system can have different designs. As an example, in the embodiment shown in FIG. 3, the spring system comprises at least one spring 13 designed as a transverse spring, by means of which the measuring cell 1 can be clamped in the measuring cell receptacle 3 in a transverse clamping direction running substantially perpendicularly to the measurement chamber axis L. The spring or each spring 13, configured as a transverse spring, is designed, for example, in such a way that it can be clamped by a clamping force which can be exerted thereon perpendicularly to the measurement chamber axis L from the outside by the measuring cell receptacle 3.

Alternatively or in addition to the at least one transverse spring, the spring system comprises, for example, at least one spring 15 designed as an axial spring, by means of which the measuring cell 1 can be clamped in the measuring cell receptacle 3 in an axial clamping direction extending parallel to the measurement chamber axis L. Here, the spring or each spring 15, configured as an axial spring, is for example, formed in such a way that it can be clamped by a clamping force which can be exerted thereon in parallel with the measurement chamber axis L by the measuring cell receptacle 3 from the outside.

The measuring cell receptacle 3 shown in FIG. 3 has a cavity delimited by two side elements 17 arranged opposite one another and a base element 19 of the measuring cell receptacle 3, into which cavity the measuring cell 1 is or can be inserted through an opening 21 of the measuring cell receptacle 3 that is opposite the base element 17. The measuring cell 1 and/or the measuring cell receptacle 3 is/are preferably designed such that the measurement chamber axis L extends in parallel with a straight line extending through both side elements 17 when the measuring cell 1 is inserted into the measuring cell receptacle 3.

Furthermore, the measuring cell receptacle 3 comprises a clamping device which is designed to exert a clamping force on the or each spring 13, 15, of the spring system of the measuring cell 1 that is inserted or clamped in the measuring cell receptacle 3.

The clamping device can have different designs depending on the design of the spring system. Thus, the clamping device may comprise, for example, a transverse clamping device for clamping the at least one or each spring 13, designed as a transverse spring of the spring system, and/or an axial clamping device for clamping the at least one or each spring 15 of the spring system designed as an axial spring.

In the embodiment shown in FIG. 3, the transverse clamping device comprises a clamping element 23 and a counter bearing formed by the base element 19. The clamping element 23 is designed such that it can be moved into a starting position in which the clamping element 23 releases the opening 21 in such a way that the measuring cell 1 can be inserted into the measuring cell receptacle 3 through the opening 21. In addition, the clamping element 23 is designed such that it can be moved into a clamping position and can be fixed in the clamping position in such a way that the clamping element 23 exerts a clamping force which acts in the direction toward the measurement chamber 7 on the at least one, or each, spring 13, designed as a transverse spring, of the measuring cell 1 arranged in the measuring cell receptacle 3, by means of which measuring cell 1 is clamped in the transverse direction between the clamping element 23 and the base element 19.

A device defined by the two side elements 17, for example, is suitable as an axial clamping device. In the embodiment shown in FIG. 3, a distance of the two side elements 17 from one another is of such a size that the side elements 17 exert a force parallel to the measurement chamber axis L from the outside on the at least one or each spring 15, designed as an axial spring, of the measuring cell 1 inserted into the measuring cell receptacle 3. This embodiment offers the advantage that the axial clamping process is brought about by the side elements 17, which are present in any case, and therefore no additional components and/or clamping elements are required for axially clamping the measuring cell 1. Another advantage is that axial clamping is automatically performed during the insertion of the measuring cell 1 into the measuring cell receptacle without a separate working step having to be performed for this purpose.

Alternatively, instead of the transverse clamping device shown here and/or the axial clamping device shown here, at least one clamping device having a different design can also be used which is designed to cooperate with the spring system and clamp the measuring cell 1 in the measuring cell receptacle 3 in at least one clamping direction.

Figure 4:
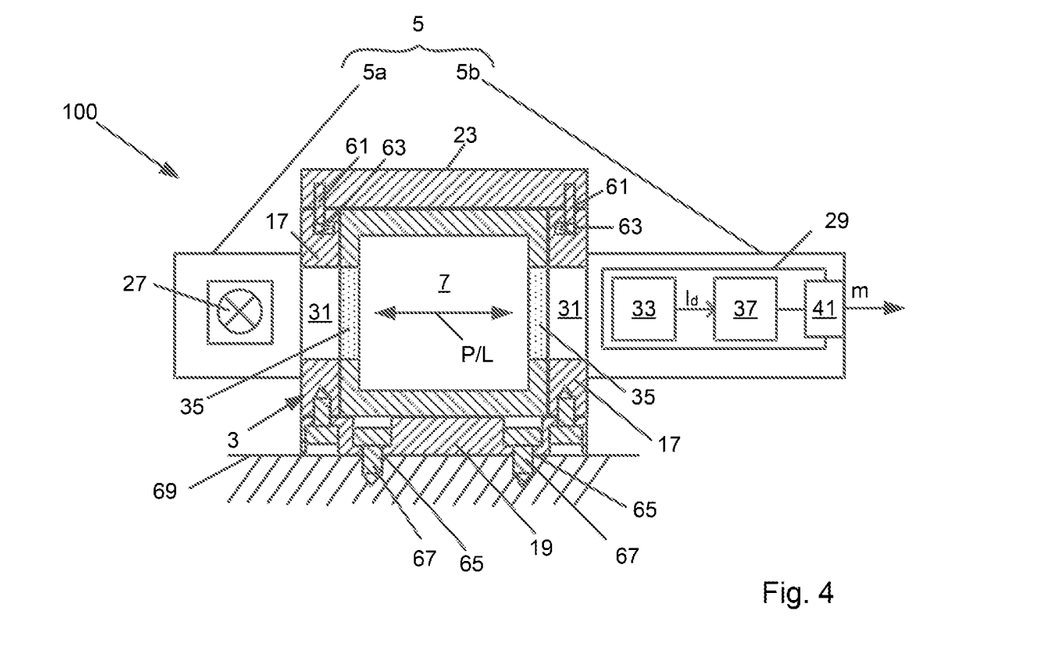
FIG. 4 shows a measuring device according to the present disclosure having a measuring cell clamped in a measuring cell receptacle and a sensor.

FIG. 4 shows a sectional drawing of an embodiment of a measuring device 100 which comprises the measuring cell 1, the measuring cell receptacle 3 and the sensor 5 for measuring at least one measured variable for a medium located in the measurement chamber 7 of the measuring cell 1 or flowing through the measurement chamber 7.

Sensors known from the prior art are particularly suitable as the sensor 5. In this respect, the sensor 5 is designed, for example, as an optical sensor, as a turbidity sensor for measuring turbidity of the medium, as a sensor for measuring a solid concentration in the medium, as a fluorescence sensor or as an absorption sensor, for example as a sensor for measuring a spectral absorption coefficient or a concentration of an analyte in the medium.

As illustrated in FIG. 4, the sensor 5 comprises, for example, at least one component 5a, 5b, which is or can be fastened on an outer side of one of the two side elements 17 in each case. As shown in FIG. 3, the side element, or each side element, 17, has on its outer side in each case a fastening device 25, such as a threaded connector, to which a complementary fastening device of the component 5a, 5b of the sensor 5, which component is or can be mounted on the relevant side element 17, is or can be connected.

The sensor 5 shown by way of example in FIG. 4 comprises a first component 5a, which is or can be mounted on the outer side of one of the side elements 17 and comprises a transmitting device 27 and a second component 5b which is or can be mounted on the outer side of the opposite side element 17 and comprises a measuring device 29.

The transmitting device 27 shown by way of example comprises, for example, at least one radiation source, in particular a light source, a UV light source, an IR light source and/or a light-emitting diode, and is designed to transmit transmission radiation into the measurement chamber 7 through an opening 31 provided in the side element 17, on which the first component 5a is or can be mounted.

The measuring device 29 shown by way of example comprises, for example, a detector 33, and is designed to receive measurement radiation resulting from an interaction of the transmission radiation along an optical path P running through the medium located in the measurement chamber 7 and exiting from the measuring cell 1 through an opening 31 that is provided in the side element 17, on which the second component 5b is or can be mounted, and to determine and provide a measured signal $I_d$, which is dependent on the measured variable, or on each measured variable.

In conjunction with sensors 5, such as optical sensors, which transmit transmission radiation into the measurement chamber 7 and/or receive measurement radiation exiting from the measurement chamber 7, there is, depending on the type of sensor, at least one outer wall, or each of the two outer walls of the measurement chamber 7, which walls are each made of a transparent material and lie opposite one another along the optical path P running in parallel with the measurement chamber axis L. For this purpose, the measuring cell 1 as a whole can consist of a transparent material. Alternatively, a transparent window 35 can be inserted at least one of, or each of, the two outer walls of the measurement chamber 7.

Alternatively, instead of the sensor shown in FIG. 4, a sensor can also be used which comprises a component having a sensor element that is in contact with the medium in the measuring mode. In this case, this component is fastened to the outer side of one of the side elements 17 in such a way that the sensor element is in contact with the medium located in the measurement chamber 7 or flowing through the measurement chamber 7 through an opening provided in this side element 17 and an opening of the measurement chamber 7. In this case, the component preferably has a region which closes off the opening of the measurement chamber 7 when mounted.

Figure 5:
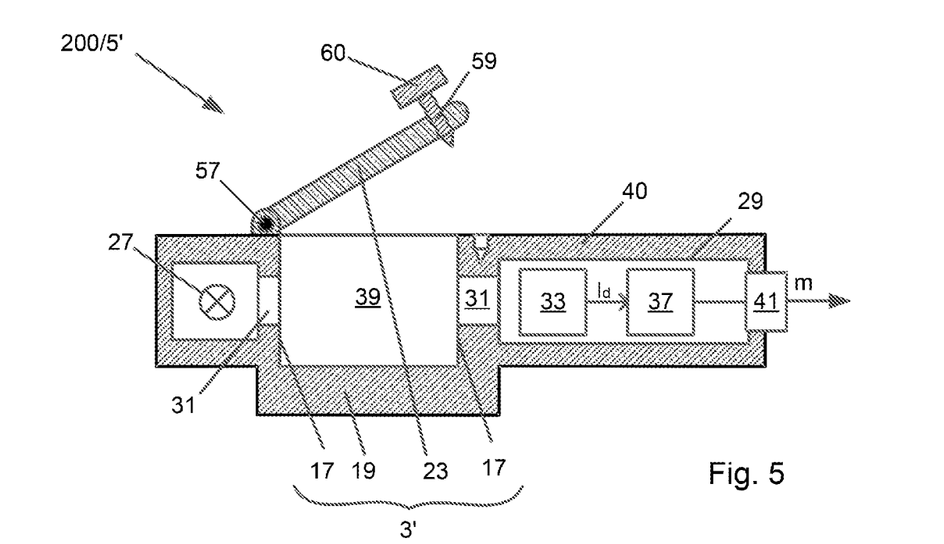
FIG. 5 shows a measuring device designed as a sensor.

FIG. 5 shows a measuring device 200 designed as a sensor 5' as an alternative. The measuring device 200 shown in FIG. 5 differs from the measuring device 100 shown in FIG. 4 in that the measuring cell receptacle 3' is designed as a component of the sensor 5'. For this purpose, the sensor 5' comprises a recess 39 for receiving the measuring cell 1, into which recess the measuring cell 1 is or can be inserted. The measuring cell 1 is or can be clamped in this recess 39 by means of the clamping device described above, likewise designed here as a component of the sensor 5'. In this embodiment, the side elements 17 and the base element 19 are each formed by a housing region of a sensor housing 40 of the sensor 5', for example. Here, too, at least one of the side elements 17 has an opening 31, for example an opening 31 through which transmission radiation is transmitted into the measurement chamber 7 of the measuring cell 1 (not shown in FIG. 5) that is clamped in the sensor 5', or through which measurement radiation emitted from the measurement chamber 7 is received in the measuring mode. Optionally, a window can be inserted into this/these opening(s) 31. Apart from the differences which result from the fact that the measuring cell receptacle 3' is designed here as a component of the sensor 5', the measuring cell 1, the sensor 5' and the measuring cell receptacle 3' are each designed, for example, analogously or identically to the embodiments described in reference to FIGS. 1 to 4 and/or have the components and/or embodiments described in reference to FIGS. 1 to 4.

An alternative embodiment includes a modification of the measuring device 200 shown in FIG. 5, in which the measuring cell receptacle 3, which is described in reference to FIG. 3 and comprises the clamping device, is or can be inserted into a recess having an analogous design to the recess 39 shown in FIG. 5 of a sensor formed analogously to the sensor 5' shown in FIG. 5.

Regardless of whether the measuring device 100, 200 is designed as a sensor 5' or comprises the sensor 5, the sensor 5, 5' can optionally additionally comprise an evaluation device 37 integrated in the measuring device 29 or connected to the measuring device 29, said evaluation device determining a measurement result m for the measured variable(s) based on the measured signals $I_d$ output by the detector 33, displaying it via an interface 41 connected thereto, outputting it in the form of measured values, in the form of measured signals and/or in some other way and/or making it available in readable form.

The measuring cell 1, the measuring cell receptacle 3, 3' and the measuring device 100, 200 have the aforementioned advantages. Individual components of the measuring cell 1, the measuring cell receptacle 3, 3' and/or the measuring device 100, 200 can each have embodiments that can be used in isolation and/or in combination with one another.

The measuring cell 1 is thus designed, for example, as a flow-through cell and/or as a disposable measuring cell. Alternatively or additionally, the measuring cell 1 has, for example, a measuring cell body 43 made of a plastic and/or a sterilizable material. The measuring cell body 43 is designed, for example, as a single-piece body, which in particular also comprises the spring system designed in this case as an integral component of the measuring cell body 43. A particular embodiment provides that the measuring cell 1 or the measuring cell body 43 forming the measuring cell 1 is designed as an injection-molded part. The latter is advantageous in particular in conjunction with measuring cells 1 designed and/or used as a disposable measuring cell because large quantities of measuring cells 1 can be cost-effectively produced using a single injection mold. Another advantage is that in this way even complex spring systems can be manufactured very cost-effectively as an integral component of the measuring cell 1 or of the measuring cell body 43 designed as an injection-molded part.

Alternatively or additionally, the spring system can have different designs. One embodiment includes in that the spring 13, 15, at least one of the springs 13, 15 or each spring 13, 15, is in each case designed as a substantially rod-shaped spring element which comprises an end region 13a, 15a connected to a rigid region of the measuring cell body 43 of the measuring cell 1 and a rod-shaped spring region 13b, 15b connected thereto which can be clamped by the clamping force exertable on the relevant spring 13, 15 from the outside. Each rod-shaped spring region 13b, 15b is designed, for example, as a straight, or single- or multiple-curve region. Alternatively or additionally, each clampable spring region 13b, 15b is formed, for example, by a flexible region of the measuring cell body 43. The flexibility of the relevant spring region 13b, 15b is adjustable, for example, by the length and/or the cross-sectional area of the relevant spring region 13b, 15b being of a corresponding size that is within limits predetermined by the material of the measuring cell body 43.

In the embodiment shown in FIG. 2, the rod-shaped spring region 13b of the at least one spring, or of each spring, 13, designed as a transverse spring has, for example, a distal end region 13c opposite the proximal end region 13a that is connected to the rigid region of the measuring cell body 43, which end region 13c can be deflected in the transverse direction by the clamping force that can be exerted on the relevant spring 13 from the outside in the transverse direction, i.e., the direction extending perpendicular to the measurement chamber axis L. For this purpose, the rod-shaped spring region 13b of the transverse spring, or of each of these transverse spring(s), can extend, for example, in a direction extending perpendicular to the measurement chamber axis L. Optionally, each rod-shaped spring region 13b formed in this way can additionally be oriented in such a way that its end region 13c, which is deflectable in the transverse direction, projects outward in the transverse direction, i.e., in the direction away from the measurement chamber 7 and extending perpendicular to the measurement chamber axis L when the relevant spring 13 is relaxed.

Analogously, the rod-shaped spring region 15b of the at least one spring, or each spring, 15, formed as an axial spring can also comprise, for example, a distal end region 15c that is deflectable in the axial direction by the axial clamping force that can be exerted thereon from the outside in the axial direction, i.e., in a direction extending parallel to the measurement chamber axis L, which end region 15c is opposite the end region 15a connected to the rigid region of the measuring cell body 43. In this case, each rod-shaped spring region 15b formed in this way is optionally oriented, for example, in such a way that the deflectable end region 15c thereof protrudes outward in the axial direction, i.e., in the direction away from the measurement chamber 7 and extending parallel to the measurement chamber axis L when the relevant spring 15 is relaxed. FIGS. 2 and 3 show an alternative embodiment in which the rod-shaped spring region 15b of the at least one, or each, spring 15, formed as an axial spring, extends in a direction extending perpendicular to the measurement chamber axis L when the relevant spring 15 is relaxed, and the end region 15c that is deflectable in the axial direction has a projection 45 which projects outwards in the axial direction, i.e., in the direction extending parallel to the measurement chamber axis L, in the direction away from the measurement chamber 7.

Depending on the configuration, the spring system can comprise one or more springs 13, 15, which can have a different arrangement depending on the overall configuration. In FIGS. 2 and 3, an embodiment is shown in which the measuring cell body 43 comprises a measurement chamber wall 47, which surrounds the measurement chamber 7 in the axial direction, at least in portions, on the outside and whose two opposite end regions along the measurement chamber axis L are each surrounded on the outside on all sides by an end plate 49 extending radially outward perpendicular to the measurement chamber axis L. These end plates 49 offer the advantage that they have an effect which strengthens and stabilizes the shape of the measuring cell body 43.

Furthermore, they offer the advantage that at least one spring, or each spring, 13, 15, of the spring system can be realized in each case by a corresponding shape of the end plates 49. In this case, at least one of the two end plates 49 comprises the spring, or at least one of the springs, 13, 15. As shown in FIGS. 2 and 3, the rod-shaped spring region 13b, 15b of these springs 13, 15 is, for example, formed by a correspondingly shaped outer edge region of one of the two end plates 49.

In the example shown in FIG. 2, each end plate 49 comprises four outer edges arranged in a square or in a rectangle. At least one of the end plates 49, or each end plate 49, is in each case designed such that a first edge and/or a second edge opposite the first edge of the relevant end plate 49 comprises one or two springs 13, which are arranged opposite one another, are formed in each case by an edge region of the relevant edge, and are formed as transverse springs, by means of which springs the measuring cell 1 can be clamped in the measuring cell receptacle 1 in the direction running perpendicularly to the measurement chamber axis L. Alternatively or additionally, at least one of the end plates 49, or each end plate 49, is designed such that a third edge and/or a fourth edge opposite the third edge of the relevant end plate 49 comprises in each case one or two springs 15, which are arranged opposite one another, are formed in each case by a correspondingly shaped edge region of the relevant edge, and are formed as axial springs, by means of which springs the measuring cell 1 can be clamped in the measuring cell receptacle 3 in a direction running in parallel with the measurement chamber axis L.

Figure 6:
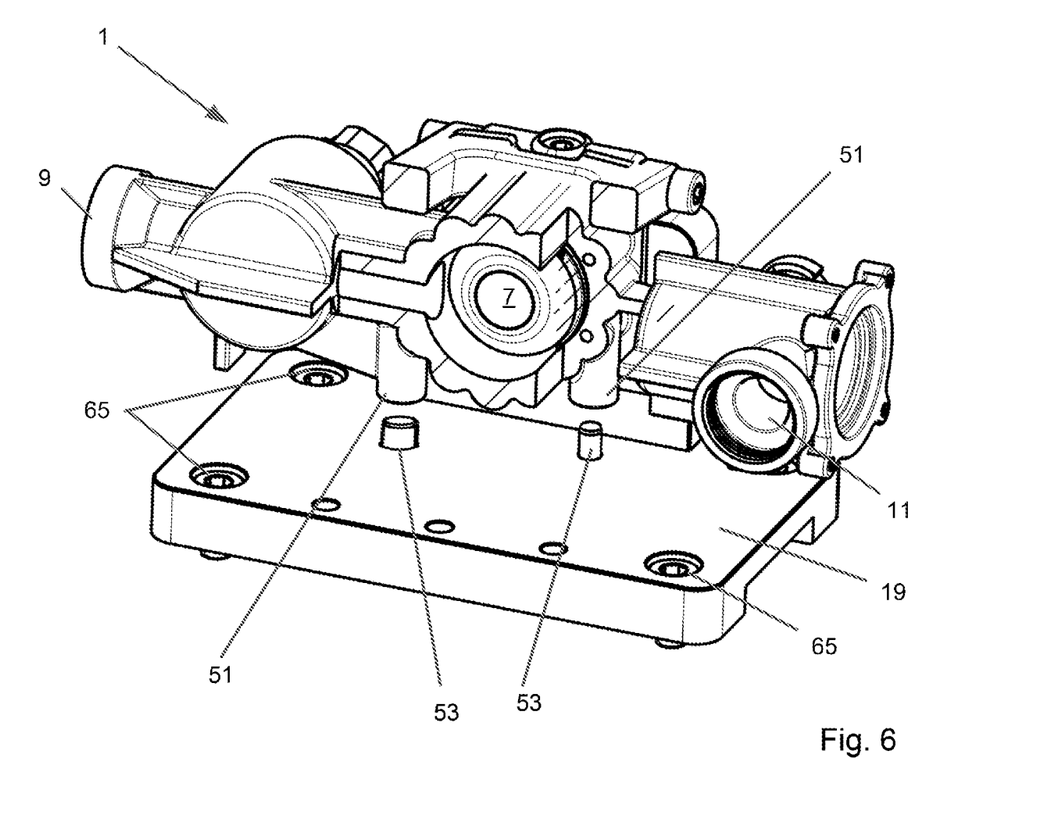
FIG. 6 shows an exploded view of the measuring cell from FIG. 2 and a base element of the measuring cell receptacle from FIG. 3.

An embodiment which can be used alternatively or in addition to the above-described embodiments resides in that the measuring cell 1, when inserted into the measuring cell receptacle 3, 3', comprises plug-connector elements 51 distributed on the outer side facing the base element 19 of the measuring cell receptacle 3, 3', in particular as plug-connector elements designed as dowel pins or recesses, which interlockingly engage in complementary plug-connector elements 53 of the base element 19 that are distributed on an inner side of the base element 19 when the measuring cell 1 is inserted into the measuring cell receptacle 3, 3' in a position which is predetermined for the measuring cell 1. For this purpose, FIG. 6 shows an exploded view of the measuring cell 1 and the base element 19 of the measuring cell receptacle 3 in the plug-connector elements 51 of the measuring cell 1 and complementary plug-connector elements 53 of the measuring cell receptacle 3 are shown. Such an embodiment, which can be analogously used to that in FIG. 5, offers the advantage that the distribution of the plug-connector element 51 of the measuring cell 1 and the corresponding distribution of the complementary plug-connector elements 53 of the base element 19 ensures that the measuring cell 1 can be inserted into the measuring cell receptacle 3 only in the position specified therefor. Furthermore, they offer the advantage that they bring about additional fixing of the measuring cell 1 in the predetermined position.

A further optional embodiment of the measuring cell 1 resides in that the inlet 9 connected to the measurement chamber 7 and/or the outlet 11 connected to the measurement chamber 7 of the measuring cell 1 each comprise a connection device 55, in particular a connection thread, to which a process connection selectable from a group of process connections having different designs can be connected. In particular, process connections having different internal diameters are suitable for this purpose.

Alternatively or in addition to the measuring cell 1, the measuring cell receptacle 3, 3' can also have different designs.

One embodiment provides that the measuring cell receptacle 3, 3' comprises fastening means, such as one or more screws, at least one mechanical latching device, at least one closure system and/or at least one locking system, by means of which the clamping element 23 of the clamping device can be fixed in the clamping position, preferably in a detachable manner.

For this purpose, FIGS. 3 and 5 show embodiments in which an end region of the clamping element 23 of the clamping device is rotatably connected to a first of the two side elements 19 via a hinge 57. In the examples shown, the fastening means comprise a screw 59 which can be screwed through the end region of the clamping element 23 remote from the hinge 57 and into the second side element 17. In FIGS. 3 and 5, the screw 59 is equipped with a rotary knob 60 arranged on an outer side of the clamping element 23, via the rotation of which the screw 59 can be screwed into and out of the second side element 17. This optional embodiment offers the advantage that the screwed connection can be produced and released again by means of the rotary knob 60, which is preferably designed as a handle, without tools and in particular also with gloves, in an easy-to-use manner. Alternatively, however, instead of the screwed connection shown here, other fastening means, such as at least a mechanical latching device, a closure system or a locking system, can also be used.

FIG. 6 shows an alternative embodiment in which the two opposite end regions of the clamping element 23 can each be fastened by fastening means to the end faces of the side elements 17 remote from the base element 19. For this purpose, fastening means are suitable, for example, which comprise at least two devices 61 arranged on the two opposite end regions of the clamping element 23, which devices preferably automatically connect, in particular in a positive-locking and/or friction-locking manner, to complementary devices 63 provided on the two side elements 17 when the clamping element 23 is moved into the clamping position. Suitable devices 61 are, for example, latching elements which, when the clamping position is reached, latch into complementary devices 63 provided in the side elements 17 and formed as receptacles when the clamping element 23 is moved into the clamping position.

At least one of the devices 61 and fastening means comprising the complementary device 63 can analogously also be used in the embodiments shown in FIGS. 3 and 5 instead of the screwed connection depicted therein. Likewise, in the example shown in FIG. 4, at least two screwed connections formed in each case in the manner described above in reference to FIGS. 3 and 5 can be used instead of the devices 61 and the complementary devices 63. In this case, the screws of these screwed connections are also preferably equipped in each case with a rotary knob, in particular designed as a handle, which is arranged on an outer side of the clamping element and the rotation of which causes the relevant screw to be screwed into and out of the associated side element without using tools.

Regardless of the choice of fastening means, the clamping element 23 has the form of a frame, shown, for example, in FIG. 3 or the form of a cover plate, shown in FIG. 6. In the example shown in FIG. 3, the frame is designed such that, in the clamping position, it exerts the clamping force acting in the transverse direction on each spring 13 formed in FIG. 3 by an outer edge region of one of the end plates 49 and designed as a transverse spring.

A further optional embodiment resides in that the measuring cell receptacle 3, 3' has a fastening device for fastening the measuring cell receptacle 3, 3' at an installation location. FIGS. 4 and 6 show by way of example bores 65 running through the base element 19 for receiving fastening screws 67, by means of which bores the base element 19 can be fastened to a carrier 69 (shown in FIG. 4) that is provided at the installation location. This offers the advantage that it prevents slippage of the measuring cell receptacle 3 during insertion and clamping of the measuring cell 1, and therefore improves the handling, in particular the insertion and clamping, as well as the replacement, of the measuring cell 1. This fastening device can also be used analogously in the variant shown in FIG. 5. There, it offers the advantage that fastening the measuring cell receptacle 3' designed as a component of the sensor 5' fastens the sensor 5' or the measuring device 200 designed as a sensor 5'.

The invention claimed is:
1. A measuring cell, comprising:
  a one-piece measuring cell body comprising:
    a measurement chamber configured to enable a medium to flow therethrough or to be filled with the medium; and
    a spring system configured as an integral part of the measuring cell body and comprising at least one spring configured to enable the measuring cell to be clamped in a measuring cell receptacle in at least one clamping direction relating to a measurement chamber axis of the measurement chamber.
2. The measuring cell according to claim 1, wherein the at least one spring of spring system is configured:
  to be clamped by a clamping force exertable thereon by the measuring cell receptacle from the outside in each case such that the measuring cell is thereby clamped in the measuring cell receptacle;

as a transverse spring in each case as to enable the measuring cell to be clamped in the measuring cell receptacle in a transverse clamping direction extending perpendicular to the measurement chamber axis; and/or as an axial spring in each case as to enable the measuring cell to be clamped in the measuring cell receptacle in an axial clamping direction extending parallel to the measurement chamber axis.

3. The measuring cell according to claim 2, wherein the at least one spring or each spring of the at least one spring is, in each case, configured as a substantially rod-shaped spring element, which comprises a proximal end region connected to a rigid region of a measuring cell body of the measuring cell and a spring region adjacent thereto, configured to be clamped by the clamping force exertable on the respective spring from the outside, wherein the spring region is in particular rod-shaped and/or formed by a flexible region of the measuring cell body.

4. The measuring cell according to claim 3, wherein:
the spring region of the at least one spring, or of each spring, is configured as a transverse spring, which in each case:
includes a distal end region, which is deflectable in a transverse direction by the clamping force exertable on the respective spring from the outside and is opposite the proximal end region connected to the measuring cell; and
extends in a direction perpendicular to the measurement chamber axis and/or is oriented such that the distal end region opposite the proximal end region connected to the rigid region of the measuring cell body protrudes outward in the transverse direction when the respective spring is relaxed; and/or
the spring region of the at least one spring, or of each spring, is configured as an axial spring, comprising in each case a distal end region, which is deflectable in an axial direction by the clamping force which can be exerted on the respective spring from the outside and is opposite the proximal end region connected to the rigid region of the measuring cell body, wherein the spring region:
is oriented such that the deflectable end region thereof protrudes outward in the direction extending away from the measurement chamber and parallel to the measurement chamber axis when the respective spring is relaxed; or
is configured such that, in a relaxed state of the respective spring, the spring region extends in a direction extending perpendicular to the measurement chamber axis, and the deflectable end region includes a projection that projects outward in a direction away from the measurement chamber and parallel to the measurement chamber axis.

5. The measuring cell according to claim 1, wherein:
two end regions, which are opposite each other along the measurement chamber axis, of a measurement chamber wall surrounding the outside of the measurement chamber, at least in portions, are each surrounded on the outside on all sides by an end plate extending radially outward perpendicular to the measurement chamber axis; and
the at least one spring, or each spring of the at least one spring, of the spring system is formed in each case by an edge region of an outer edge of one of the end plates.

6. The measuring cell according to claim 5, wherein:
each end plate comprises four outer edges arranged in a square or in a rectangle; and
at least one of the end plates, or each end plate, is configured such that:
a first edge and/or a second edge opposite the first edge of the respective end plate comprises in each case one or two springs of the spring system, which are arranged opposite one another as transverse springs such that the measuring cell can be clamped in the measuring cell receptacle in the direction extending perpendicular to the measurement chamber axis; and/or
a third edge and/or a fourth edge opposite the third edge of the respective end plate comprises one or two springs of the spring system, which are arranged opposite one another as axial springs such that the measuring cell can be clamped in the measuring cell receptacle in a direction extending parallel to the measurement chamber axis.

7. The measuring cell according to claim 1, further comprising plug-connector elements configured as dowel pins or as recesses distributed on an outer side facing a base element of the measuring cell receptacle, which plug-connector elements are configured and arranged such that, when the measuring cell is inserted into the measuring cell receptacle in a position predetermined for the measuring cell, the plug-connector elements interlockingly engage complementary plug-connector elements of the base element, which are distributed on an inner side of the base element.

8. The measuring cell according to claim 1, wherein the measuring cell:
is adapted as a flow-through cell and/or as a disposable measuring cell;
includes a measuring cell body made of a plastic and/or of a sterilizable material; and/or
includes a measuring cell body adapted as an injection-molded part and/or forming the measuring cell.

9. A measuring device, comprising:
the measuring cell
according to claim 1;
the measuring cell receptacle, comprising:
a cavity delimited by two side elements arranged opposite one another and by a base element of the measuring cell receptacle, into which cavity the measuring cell can be inserted or is inserted through an opening of the measuring cell receptacle opposite the base element such that the measurement chamber axis of the measuring cell extends parallel to a straight line extending through both side elements when the measuring cell is inserted into the measuring cell receptacle; and
a clamping device configured to exert a clamping force on the spring system of the measuring cell when inserted or clamped in the measuring cell receptacle, wherein the measuring cell is or is capable of being clamped in the measuring cell receptacle; and
a sensor configured to measure at least one measured variable for a medium located in the measurement chamber of the measuring cell or flowing through the measurement chamber.

10. The measuring device according to claim 9, wherein the measuring device is configured:
such that the sensor comprises a recess into which the measuring cell receptacle is or can be inserted; or as a sensor, wherein:

the sensor comprises the measuring cell receptacle;

the sensor includes a recess configured to receive the measuring cell, in which recess the measuring cell is or can be clamped via the clamping device; and/or the side elements and the base element of the measuring cell receptacle are each formed by a housing region of a sensor housing of the sensor.

11. The measuring device according to claim 9, wherein:

the sensor comprises a first and/or a second component, each of which is or can be fastened to an outer side of one of the two side elements;

a respective side element, or each side element, includes on its outer side, a threaded connector configured to fasten the first component or the second component of the sensor;

the first component comprises a transmitting device configured to transmit transmission radiation into the measurement chamber through an opening provided in the respective side element, on which the first component is or can be mounted, and through a transparent outer wall of the measurement chamber, or through a window inserted into an outer wall of the measurement chamber; and/or the second component comprises a measuring device configured to receive measurement radiation, which exits the measurement chamber through a transparent outer wall of the measurement chamber, or through a window inserted into an outer wall of the measurement chamber, through an opening provided in the respective side element on which the second component is or can be mounted, and to determine and provide a measured signal that is dependent on the at least one measured variable or on each measured variable of the at least one measured variable, wherein the measuring device comprises a detector and/or is configured to provide the measured signal to an evaluation device integrated in the measuring device or connected to the measuring device, which evaluation device determines a measurement result for the at least one measured variable based on the measured signal and which displays the measurement result via an interface connected thereto, outputs the measurement result in the form of measured values, in the form of measured signals and/or in some other way, and/or makes the measurement result available in readable form.

12. The measuring device according to claim 9, wherein:

the sensor is configured as an optical sensor, as a turbidity sensor for measuring turbidity of the medium, as a sensor for measuring a solid concentration in the medium, as a fluorescence sensor or as an absorption sensor for measuring a spectral absorption coefficient or a concentration of an analyte in the medium;

an inlet connected to the measurement chamber and/or an outlet connected to the measurement chamber of the measuring cell each comprise a connection feature to which a process connection selectable from a group of process connections having different designs can be connected; and/or the measuring cell receptacle includes a fastening device configured to fasten the measuring cell receptacle at an installation location, the fastening device comprising bores extending through the base element for receiving fastening screws, by which fastening screws the base element can be fastened to a carrier provided at the installation location.

13. The measuring device according to claim 9, wherein:

the clamping device comprises a transverse clamping device, which includes a clamping element and a counter bearing formed by the base element; and the clamping element is configured such that the clamping element can be moved:

into a starting position, in which the clamping element releases the opening such that the measuring cell can be inserted through the opening and into the measuring cell receptacle; and into a clamping position and fixed in the clamping position such that the clamping element exerts a clamping force on the at least one spring, or each spring of the at least one spring, configured as a transverse spring of the measuring cell arranged in the measuring cell receptacle, by which clamping force the measuring cell is clamped between the clamping element and the base element.

14. The measuring device according to claim 13, wherein:

an end region of the clamping element is rotatably connected via a hinge to a first of the two side elements, and an end region of the clamping element remote from the hinge is or can be detachably fastened to a second of the two side element by a mechanical latching device, by a closure system, by a locking system or by a screw that can be screwed through the clamping element into the second side element; or the clamping element has two end regions opposite each other which are or can be detachably fastened by fastening means on the end faces of the side elements remote from the base element, wherein the fastening means comprise:

at least one of mechanical latching devices, a closure system, a locking system and, in each case, screws that can be screwed through the clamping element into one of the side elements; or at least two devices that are arranged on the two opposite end regions of the clamping element, and which connect automatically, positively and/or non-positively, to complementary devices on the two side elements when the clamping element is brought into the clamping position.

15. The measuring device according to claim 9, wherein:

the clamping device comprises an axial clamping device formed by the two side elements; and a distance of the two side elements from one another is of such a size that the side elements exert a force parallel to the measurement chamber axis from the outside onto the at least one spring, or each spring, configured as an axial spring of the measuring cell inserted into the measuring cell receptacle.

* * * * *